(12) United States Patent
Goto et al.

(10) Patent No.: US 10,493,921 B2
(45) Date of Patent: Dec. 3, 2019

(54) STRUCTURE OF VEHICLE LUGGAGE COMPARTMENT

(71) Applicant: HONDA MOTOR CO., LTD., Tokyo (JP)

(72) Inventors: Yujiro Goto, Wako (JP); Koji Saido, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 70 days.

(21) Appl. No.: 15/691,971

(22) Filed: Aug. 31, 2017

(65) Prior Publication Data

US 2018/0065561 A1    Mar. 8, 2018

(30) Foreign Application Priority Data

Sep. 2, 2016   (JP) .................. 2016-171623

(51) Int. Cl.
| | |
|---|---|
| *B60P 7/08* | (2006.01) |
| *B60R 5/04* | (2006.01) |
| *B60P 7/135* | (2006.01) |
| *B60P 3/00* | (2006.01) |

(Continued)

(52) U.S. Cl.
CPC .............. *B60R 5/04* (2013.01); *B60P 3/007* (2013.01); *B60P 7/0892* (2013.01); *B60P 7/135* (2013.01);
(Continued)

(58) Field of Classification Search
CPC .......... B60P 7/0892; B60P 7/135; B60P 7/14; B60P 3/007; B60R 5/04; B60R 7/022; B60R 5/00; B60R 7/00; B60R 9/06; B60R 9/065; B62D 33/04; B62D 33/042; B62D 33/046
(Continued)

(56) References Cited

U.S. PATENT DOCUMENTS

| | | | | |
|---|---|---|---|---|
| 5,167,479 A | * | 12/1992 | Bott ................. | B01D 53/485 410/121 |
| 7,866,926 B2 | * | 1/2011 | Lim ................. | B60R 7/02 410/121 |

(Continued)

FOREIGN PATENT DOCUMENTS

| | | |
|---|---|---|
| JP | 2000-142241 A | 5/2000 |
| JP | 2005-007936 A | 1/2005 |

(Continued)

OTHER PUBLICATIONS

Japanese Office Action with English translation dated Sep. 24, 2019 (6 pages).

*Primary Examiner* — Stephen T Gordon
(74) *Attorney, Agent, or Firm* — Rankin, Hill & Clark LLP

(57) ABSTRACT

A structure of a vehicle luggage compartment of the present invention can be produced at a low cost; secure a luggage placing base; and prevent breakage of a partition member, and includes a luggage base on which a luggage is placed; and a partition having a belt shape configured to separate the luggage base from other luggage placing bases, wherein both ends of the partition are detachably engaged with a pair of hooks attached to a vehicle body; and at least one of the pair of hooks is deformed to disengage from the partition if a load equal to or bigger than a predetermined magnitude is applied to the partition.

7 Claims, 7 Drawing Sheets

(51) Int. Cl.

| | |
|---|---|
| *B60R 5/00* | (2006.01) |
| *B60R 9/06* | (2006.01) |
| *B60P 7/14* | (2006.01) |
| *B60R 7/00* | (2006.01) |
| *B62D 33/04* | (2006.01) |
| *B60R 7/02* | (2006.01) |

(52) U.S. Cl.
CPC .................. *B60P 7/14* (2013.01); *B60R 5/00* (2013.01); *B60R 7/00* (2013.01); *B60R 7/02* (2013.01); *B60R 9/06* (2013.01); *B60R 9/065* (2013.01); *B62D 33/04* (2013.01); *B62D 33/042* (2013.01); *B62D 33/046* (2013.01)

(58) Field of Classification Search
USPC .......... 410/94, 117–118, 121, 129, 140, 143, 410/145; 296/24.4, 37.5, 37.6; 224/42.34, 404, 526, 530; 248/351
See application file for complete search history.

(56) References Cited

U.S. PATENT DOCUMENTS

| | | | |
|---|---|---|---|
| 7,988,392 B2 * | 8/2011 | Aebker | ................... B60R 5/045 410/89 |
| 2016/0059765 A1 * | 3/2016 | Stakoe | ................. B60P 7/0807 296/37.8 |

FOREIGN PATENT DOCUMENTS

| | | | |
|---|---|---|---|
| JP | 2005-029048 A | 2/2005 | |
| JP | 3205190 U | 7/2016 | |

* cited by examiner

Front ←——→ Rear

STRUCTURE OF VEHICLE LUGGAGE COMPARTMENT

CROSS-REFERENCE TO RELATED APPLICATIONS

The present application relates to and claims priority from Japanese patent application No. 2016-171623, filed on Sep. 2, 2016, entirety of whose contents and subject matter is incorporated herein by reference.

BACKGROUND OF THE INVENTION

1) Field of the Invention

The present invention relates to a structure of a vehicle luggage compartment.

2) Description of the Related Art

There is known a conventional luggage compartment at a rear side of a vehicle, for example, one having a concave portion formed in an inner circumferential wall of a luggage compartment. In such a luggage compartment, a reticulate partition member is provided so as to cover the concave portion and to separate the concave portion from a remaining inner area of the luggage compartment (see Japanese Patent Application Laid-Open Publication No. 2000-142241). The partition member is configured to be wound for accommodation by a winding device, and a distal end of the partition member is engaged with a fixing hook when the partition member is pulled out.

Another configuration for separating the concave portion from the remaining inner space of the luggage compartment is a structure in which a rubber belt is laid across the lower side portion of the concave portion. The belt is fixed to a rear end of a vehicle body, and a distal end portion of the belt is engaged with a hook provided at a front portion of the luggage compartment. This configuration enables preventing a luggage stored in the concave portion from slipping out the luggage compartment.

BRIEF SUMMARY OF THE INVENTION

The configuration of the above Japanese Patent Publication No. 2000-142241 has a problem that the reticulate partition member and the winding device are so large to reduce an area for a luggage placement and to cause a cost-up. In addition, the configuration using the rubber belt has a problem that slack of the belt may make poor an appearance of the luggage compartment and prevent the luggage from being well hooked, and another problem that the belt, a rear door, and the like may be damaged if the rear door is closed in a situation in which the belt is hanging outward from the rear opening.

In view of the above problems of the conventional configuration, it is an object of the present invention to provide a structure of a vehicle luggage compartment that can be low in cost, secure a luggage placing area, and prevent breakage of the partition member.

SUMMARY OF THE INVENTION

In order to achieve the above object, a structure of a vehicle luggage compartment according to the present invention includes a luggage base on which a luggage is placed; and a partition having a belt shape and configured to separate the luggage base from other luggage spaces in the compartment. Both ends of the partition are detachably engaged with a pair of hooks attached to a vehicle body; and at least one of the pair of hooks is deformed to disengage from the partition if a load equal to or bigger than a predetermined magnitude is applied to the partition.

According to such a configuration, the partition is belt shaped and downsized so that the partition can be low-cost, occupy a smaller space in the luggage compartment, and secure a luggage placing base. Furthermore, even if a load equal to or greater than a predetermined magnitude is applied on the partition, the partition can be disengaged from the hook, and thus, breakage of the partition and the hook can be prevented.

Further, the structure of the vehicle luggage compartment according to the present invention includes a luggage base on which a luggage is placed, and a partition having a belt shape and separating the luggage base from other luggage spaces in the compartment. Both ends of the partition are detachably engaged with a pair of hooks attached to a vehicle body, and the partition is configured to extend when a load equal to or bigger than a predetermined magnitude is applied.

Above-described configuration provides the belt shaped and downsized partition, and therefore, allows the partition to be low-cost, to occupy a narrower space in the luggage compartment, and to secure a luggage placing base. Furthermore, the partition extends when a load equal to or greater than a predetermined magnitude is applied, and therefore, breakage of the partition and the hook can be prevented. In addition, the partition is extendable so as to be easy to engage with the hook.

Effect of the Invention

According to the present invention, it is possible to obtain a vehicle luggage compartment structure that can be low in cost, secure a luggage placing base, and prevent breakage of the partition member.

DETAILED DESCRIPTION OF THE INVENTION

Detailed description is made of the first embodiment of the present invention with reference to the drawings appropriately as needed. The same component is denoted by the same reference sign to omit duplicated explanations. An explanation of a direction is given based on a front, back, left, right, upper and lower as viewed from a driver.

Figure 1:
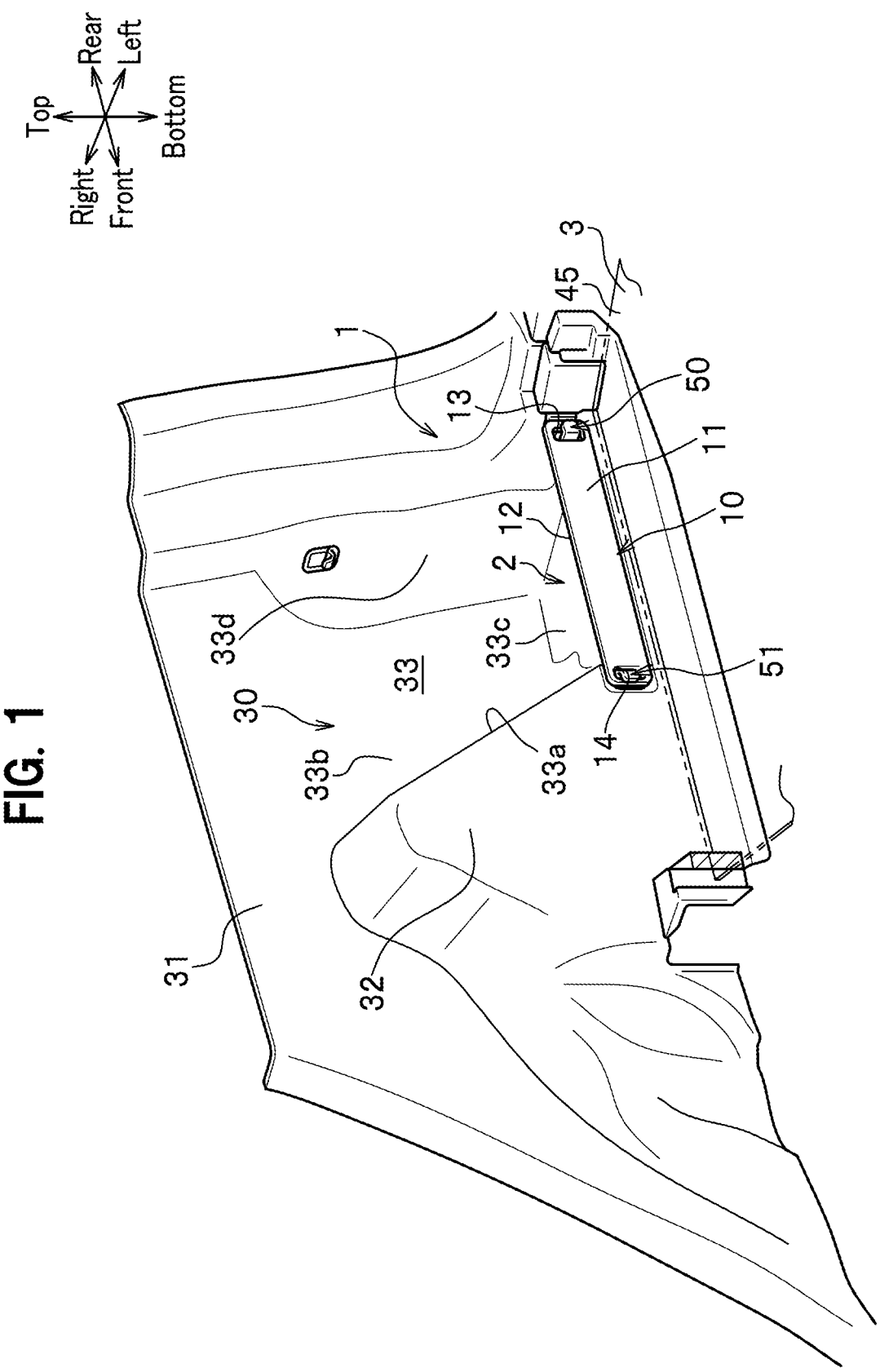
FIG. 1 is a perspective view of a vehicle luggage compartment structure according to a first embodiment of the present invention as seen obliquely from the front.
Figure 2:
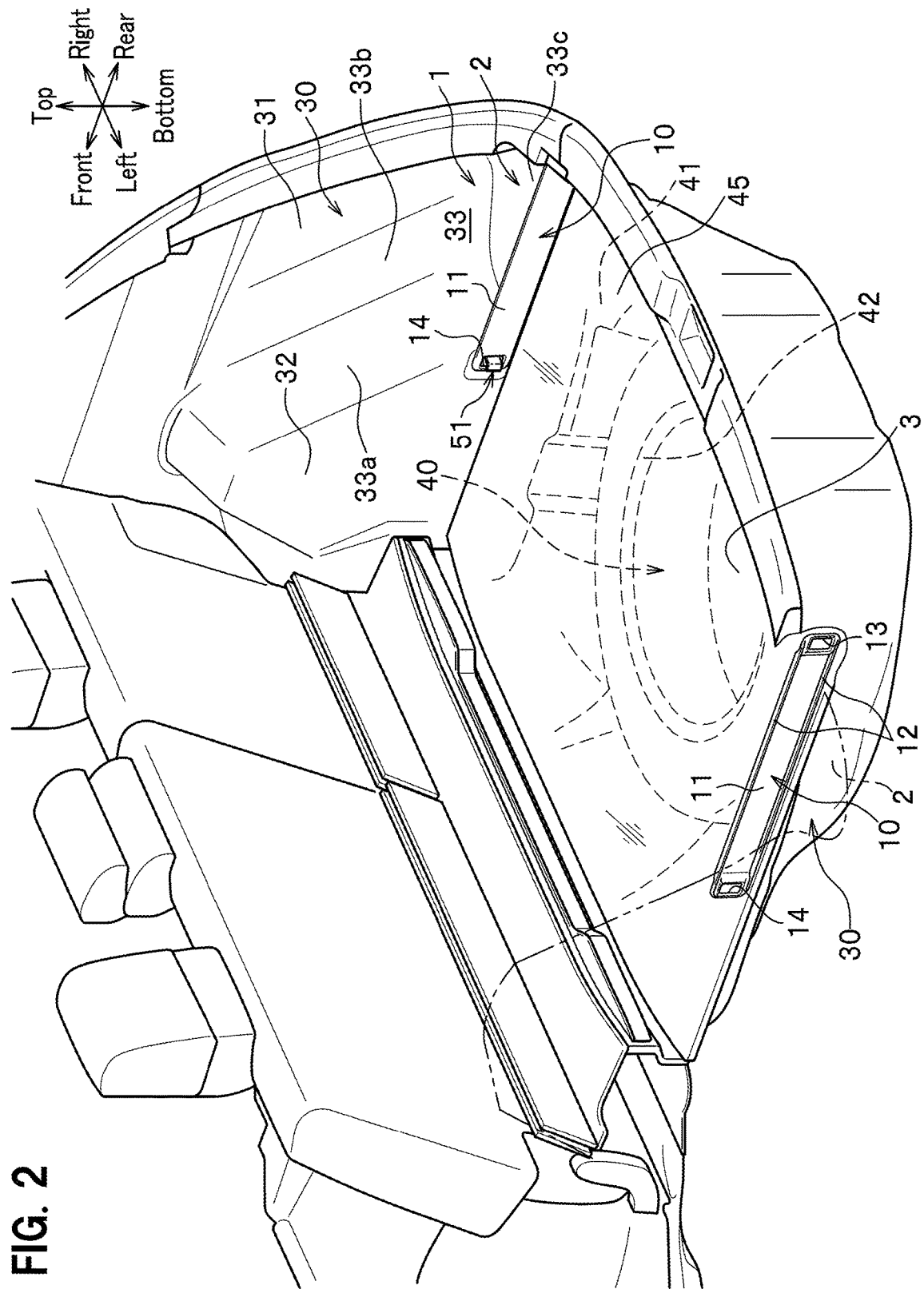
FIG. 2 is a perspective view of the vehicle luggage compartment structure according to the first embodiment of the present invention as seen obliquely from the rear.
Figure 3:
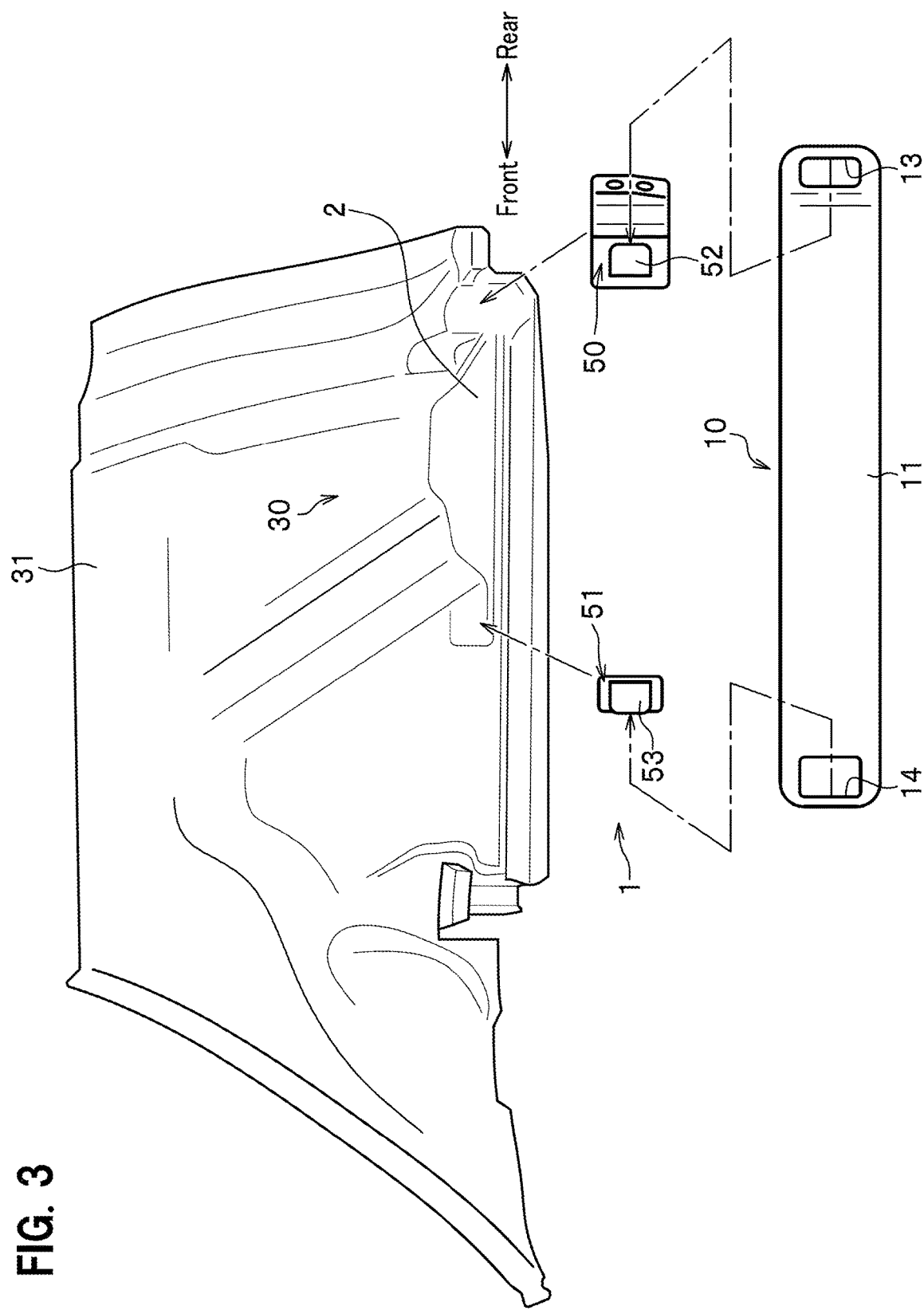
FIG. 3 is an exploded side view of the vehicle luggage compartment structure according to the first embodiment of the present invention as seen from the inside of the vehicle.

As described by FIGS. 1 to 3, a vehicle luggage compartment structure 1 according to a first embodiment of the present invention includes a luggage base 2 on which a luggage is placed and a partition 10 separating the luggage base 2 from other luggage placing bases 3, and hooks 50 and 51 for fixing the partition 10 to a vehicle. Specifically, the luggage compartment according to the present embodiment includes a side luggage space 30, a bottom luggage space 40 (see FIG. 2), a floor board 45, and a partition 10. The present embodiment is described taking as an example a case in which the partition is provided at a rear portion of the vehicle.

As shown in FIGS. 1 and 2, the side luggage spaces 30 are provided respectively at both end portions in a vehicle width direction at a rear portion of the vehicle. The side luggage spaces 30 are formed on inner panels 31 inside rear fenders and formed inside concave portions 33 formed behind tire houses 32 of the inner panels 31. The concave portions 33 each bulges from an extension line of the inner end in the vehicle width direction of the tire house 32 to the outside in the vehicle width direction. The side luggage spaces 30 each is defined by a front face portion 33a of the concave portion 33 (a rear wall portion of the tire house 32), an outer face portion 33 b (outer wall portion of the inner panel 31), a bottom surface portion 33c, and a rear surface portion 33d. The bottom surface portion 33c of the concave portion 33 is a luggage base 2 on which a luggage is placed.

As shown in FIG. 2, the bottom luggage space 40 is provided between a pair of right and left side luggage spaces 30; has a shape having an open top and a bottom; is formed inside a floor panel 41 whose bottom surface is hollowed downward; and accommodates a spare tire 42, a tool box (not shown), and the like. In some cases, the bottom luggage space 40 accommodates no spare tire and is used simply as a luggage compartment.

The floor board 45 covers a top of the bottom luggage space 40 and serves as a cover of the bottom luggage space 40. The floor board 45 is placed at the same height as a bottom surface portion 33c of the side luggage space 30 (luggage base 2). The floor board 45 is a luggage placing base 3 separated from the luggage base 2. Note that the floor board 45 may be placed above the partition 10 in some cases.

As shown in FIGS. 1 to 3, the partition 10 has a belt-like shape and is formed of resin having high rigidity and high impact resistance such as, for example, polypropylene (PP). Both ends of the partition 10 in a longitudinal direction thereof are detachably engaged with a pair of hooks 50 and 51 attached to the vehicle body. The partition 10 has a plate portion 11 extending in a front-rear direction.

The plate portion 11 defines an entire length of the partition 10. Both of upper and lower end portions of the plate portion 11 are respectively provided with reinforcing ribs 12 (see FIG. 2) along the longitudinal direction. The reinforcing ribs 12 are disposed orthogonally to the plate portion 11. An engaging hole 13 is formed at one end portion (rear end portion) in the longitudinal direction of the plate portion 11, which an engaging hole 13 is engaged with the rear hook 50; and an engaging hole 14 is formed at the other end portion (front end portion) in the longitudinal direction of the plate portion 11, which engaging hole 14 is engaged with the front hook 51.

The hooks 50 and 51 are fixed to the inner panels 31 and are spaced apart by a predetermined distance in the front-rear direction. The hooks 50 and 51 may be made of, for example, a thermo-plastic olefinic elastomer (TPO). The materials of the hooks 50 and 51 may not be limited to TPO. The hook 50 arranged at a rear side includes a hook portion 52 that projects toward the inside of the luggage compartment and has a distal end portion projecting rearward. The hook portion 52 is engaged with a rear edge portion of the engaging hole 13 of the partition 10. The hook 51 arranged at a front side includes a hook portion 53 that projects toward the inside of the luggage compartment and has a distal end portion projecting forward. The hook portion 53 is engaged with a front edge portion of the engaging hole 14 of the partition 10.

The hooks 50 and 51 are configured to be deformed when a load equal to or greater than a predetermined magnitude is applied to the partition 10, and the hook 50 arranged at the rear side is configured to disengage from the partition 10. Rigidity of the hook 50 arranged at the rear side is smaller than that of the hook 51 arranged at the front side. When the load equal to or greater than the predetermined magnitude is applied on the partition 10, any one of the hook portions 52 and 53 of the front and rear hooks 50 and 51 (a hook portion of any one of the hooks 50 and 51 arranged closer to a point where the load acts) is pushed to be deformed by the plate portion 11 and the plate portion 11 is detached from the deformed hook 50 or 51. A threshold of the magnitude of the load at which either of the hook portion 52 of the hook 50 and the hook portion 53 of the hook 51 is deformed is set smaller than a magnitude of a load at which the partition 10 is broken.

According to the vehicle luggage compartment structure 1 having the above-described configuration, the partition 10 has so high rigidity as not to slacken. Therefore, the partition 10 is not deteriorated in its appearance and prevents the luggage from shifting in position. In addition, the partition 10 is belt shaped and downsized, and thus the partition 10 can be produced in low-cost and configured to occupy a smaller space in the luggage compartment so as to secure the luggage placing base.

Furthermore, when a load equal to or greater than a predetermined magnitude is applied on the partition 10, the hook 50 or 51 is deformed to disengage from the partition 10 without breaking the partition 10 due to disengagement of the partition 10 from the hook 50 or 51. In other words, the partition 10 can escape the load applied thereon by deforming the hook 50 or 51 to disengage from the partition 10, and thus, the partition 10 and the hooks 50 and 51 can be prevented from being broken.

When the hook 50 arranged at the rear side is deformed and the rear end of the partition 10 is disengaged, the front end of the partition 10 can be kept locked. Therefore, even if the rear door is opened, the partition 10 may not hang outward from the rear opening. On the other hand, even if the hook 51 arranged at the front side is deformed so that the forward end of the partition 10 is disengaged, the partition 10 is disengaged from the rear hook 50 when a load directed rearward acts on the partition 10 from which the front end is detached. Therefore, even in this case, the partition 10 does not hang outward through the rear opening. Accordingly, the partition 10 is never caught in the rear door, and thus, breakage of the partition 10, the rear door, and the door frame can be prevented.

Furthermore, the partition 10 has such a simple configuration as to be produced easily and at a low-cost. The partition 10 can be produced at a lower cost than a conventional rubber belt.

Figure 4:
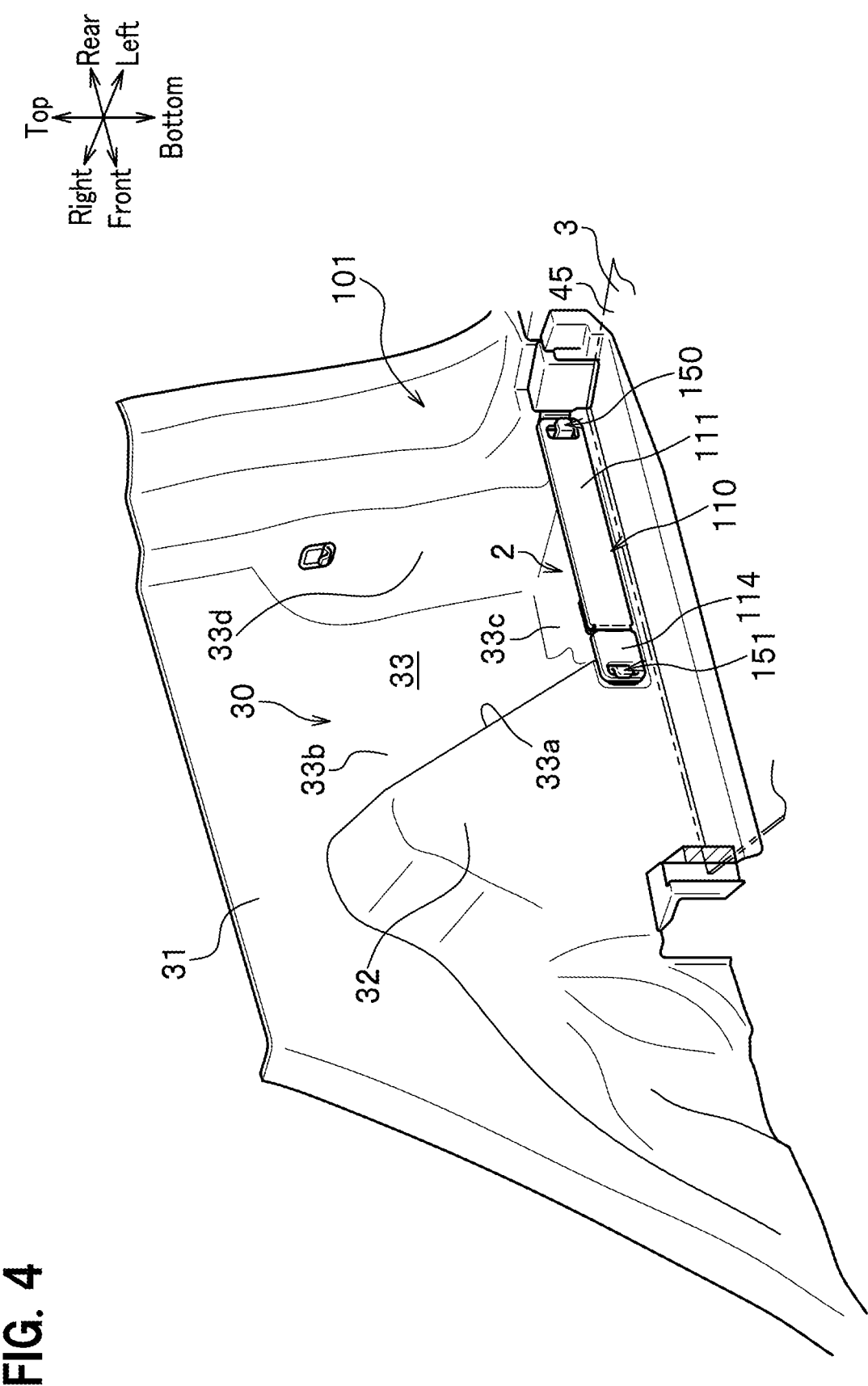
FIG. 4 is a perspective view of a vehicle luggage compartment structure according to a second embodiment of the present invention as seen obliquely from the front.

Next, description is made of a configuration of a vehicle luggage compartment structure 101 according to a second embodiment of the present invention. As shown in FIG. 4, the vehicle luggage compartment structure 101 includes a luggage base 2, a partition 110, and hooks 150 and 151 for fixing the partition 110. The luggage base 2 and its surroundings have the same configuration as that of the first embodiment, and thus, the same reference signs are given and an explanation is omitted. It should be noted that the hooks 150 and 151 have higher rigidity than that of the first embodiment.

Figure 5A:
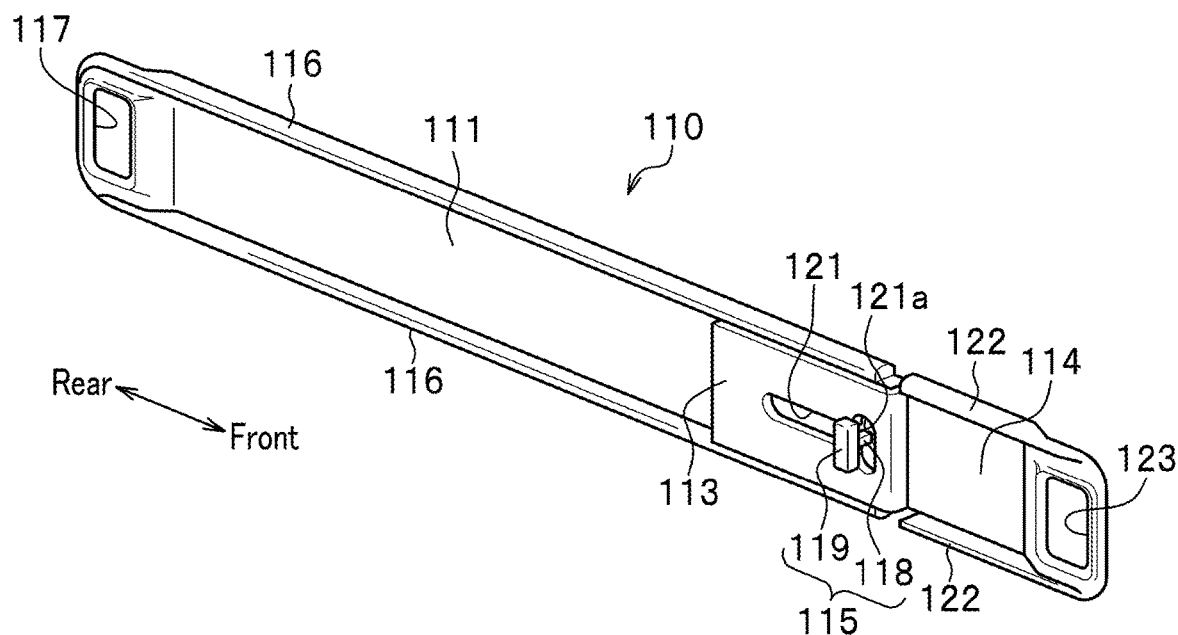
FIG. 5A is a perspective view showing a normal state of a partition of a vehicle luggage compartment structure according to the second embodiment of the present invention.
Figure 5B:
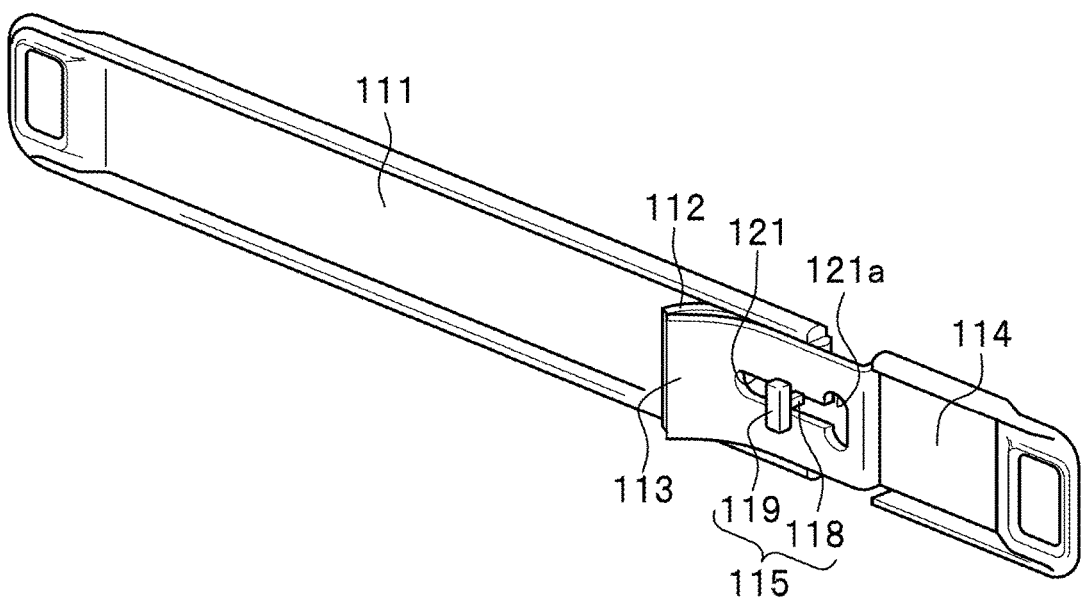
FIG. 5B is a perspective view showing an extended state of the partition.
Figure 6A:
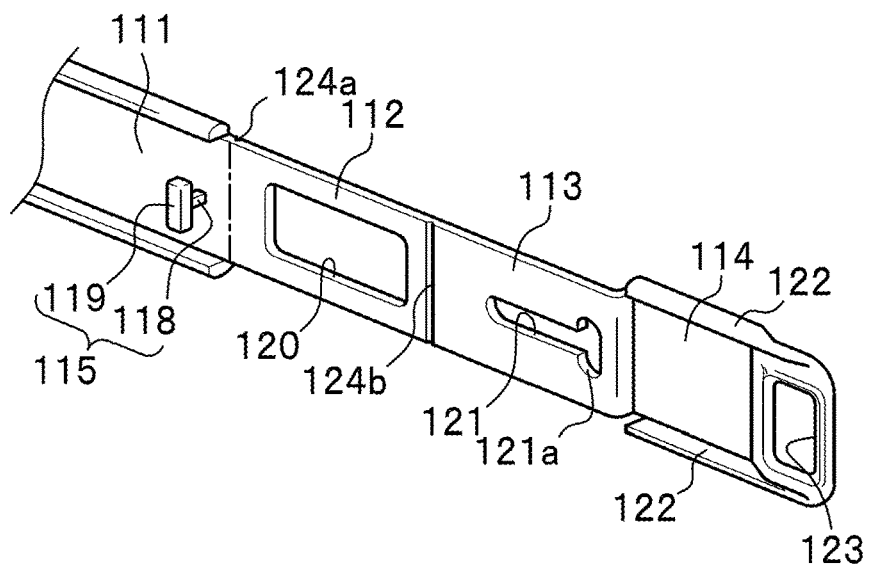
FIG. 6A is a perspective view showing a state of the partition of the vehicle luggage compartment structure according to the second embodiment of the present invention before the partition is folded.
Figure 6B:
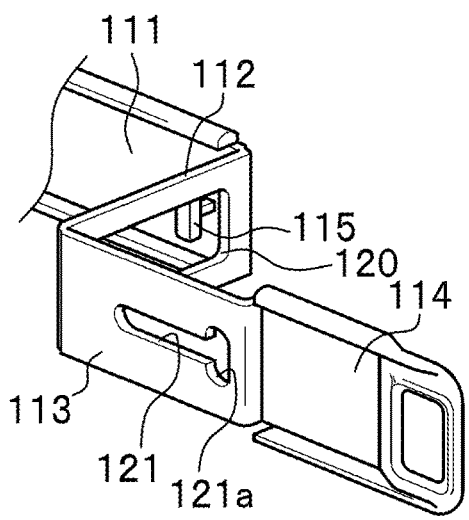
FIG. 6B is a perspective view showing a state of the partition while the partition is being folded.
Figure 6C:
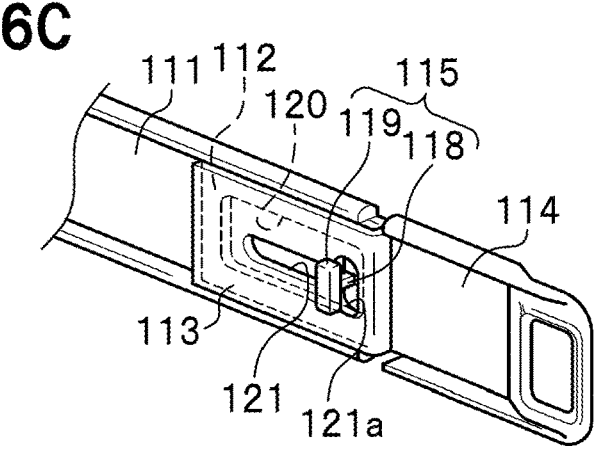
FIG. 6C is a perspective view showing a state of the partition after completion of folding.

As shown in FIGS. 5 and 6, the partition 110 has a belt-like shape and is made of resin having high rigidity and high impact resistance such as, for example, polypropylene (PP). Both ends in a longitudinal direction of the partition 110 are detachably engaged with a pair of hooks 150 and 151 (see FIG. 4) attached on a vehicle body. The partition 110 is configured to extend when a load equal to or greater than a predetermined magnitude is applied (see FIG. 5B and FIG. 6A). The partition 110 includes a first plate portion 111, a first folding-back plate portion 112, a second folding-back plate portion 113, a second plate portion 114, and a locking member 115.

The first plate portion 111 is a portion that determines an entire length of the partition 110 in combination with the second plate portion 114. The first plate portion 111 is formed longer than the second plate portion 114. The upper and lower end portions of the first plate portion 111 are respectively provided with reinforcing ribs 116 along a longitudinal direction of the first plate portion 111. The reinforcing ribs 116 are disposed orthogonally to the first plate portion 111. An engaging hole 117 with which the front hook 150 is engaged is formed at one end portion (end portion on the opposite side to the second plate portion 114) in the longitudinal direction of the first plate portion 111.

A locking member 115 is provided at an end portion (an end portion closer to the second plate portion 114) of the first plate portion 111. The locking member 115 locks the first folding-back plate portion 112 and the second folding-back plate portion 113 to the first plate portion 111 in a state in which they are folded. The locking member 115 is inserted through an elongate hole 121 formed in the second folding-back plate portion 113 to slidably lock the second folding-back plate portion 113. The locking member 115 has a T-shape including a stand-up portion 118 extending from a surface of the first plate portion 111 and a wide T-top portion 119 widening at a distal end of the stand-up portion 118. A rising dimension of the stand-up portion 118 is slightly larger than a total size of plate thicknesses of the first folding-back plate portion 112 and the second folding-back plate portion 113. The wide T-top portion 119 prevents the first and second folding-back plate portions 112 and 113 from separating from the first plate portion 111 by abutting against a surface of the second folding-back plate portion 113 when the partition 110 is extended.

The first folding-back plate portion 112 is a portion that is folded back at a front end of the first plate portion 111 along the first plate portion 111 and contacts the first plate portion 111. It should be noted that the first folding-back plate portion 112 is hidden by the second folding-back plate portion 113 in FIG. 5A. The first folding-back plate portion 112 is folded back toward the first plate portion 111 on a surface where the locking member 115 is placed. A boundary portion between the first folding-back plate portion 112 and the first plate portion 111 is formed with a guide groove 124a (see FIG. 6A) for facilitating folding back the first folding-back plate portion 112. The first folding-back plate portion 112 is provided with no reinforcing rib and is bendable. The first folding-back plate portion 112 has a rectangular through-hole 120 formed therein (see FIG. 6A). The through-hole 120 is a hole through which the locking member 115 is inserted when the first folding-back plate portion 112 is folded back to be brought into contact with the first plate portion 111.

The second folding-back plate portion 113 is folded at a distal end of the first folding-back plate portion 112 along the first plate portion 111 and the first folding-back plate portion 112. The second folding-back plate portion 113 is folded in a direction reverse to a direction in which the first folding-back plate portion 112 is folded back and is in contact with the first folding-back plate portion 112. A guide groove 124b (see FIG. 6A) for facilitating folding the second folding-back plate portion 113 is formed at a boundary portion between the second folding-back plate portion 113 and the first folding-back plate portion 112. The second folding-back plate portion 113 is not provided with reinforcing ribs and bendable.

The second folding-back plate portion 113 has the T-shaped elongate hole 121 formed. The elongate hole 121 extends in the longitudinal direction of the partition 110 and is a hole through which the locking member 115 is inserted. A widened T-top hole 121a is formed at a distal end (side close to the second plate portion 114) of the elongate hole 121. The elongate hole 121 is arranged so that the locking member 115 is positioned in the widened T-top hole 121a when the first folding-back plate portion 112 and the second folding-back plate portion 113 are folded. The widened T-top hole 121a is formed by extending a distal end portion of the elongated hole 121 in both directions toward the upper and lower sides and has a size that allows the wide T-top portion 119 of the locking member 115 to pass therethrough. The elongate hole 121 except the widened T-top hole 121a is sized to allow the stand-up portion 118 of the locking member 115 to pass through while not allowing the wide T-top portion 119 to pass through. The width of the elongate hole 121 gradually decreases as going away from the widened T-top hole 121a. A proximal end portion of the elongate hole 121 (end portion opposite to the widened T-top hole 121a) is slightly smaller in width than the stand-up portion 118. That is, as the stand-up portion 118 relatively moves toward the base end side of the elongate hole 121, a force counteracting to the movement of the stand-up portion 118 gradually increases.

The second plate portion 114 is provided at an end portion opposite to the first plate portion 111 in the partition 110. Both of the upper and lower end portions of the second plate portion 114 are respectively provided with reinforcing ribs 122 along the longitudinal direction of the second plate portion 114. The reinforcing ribs 122 have the same shape as those of the reinforcing ribs 116 of the first plate portion 111 and are arranged orthogonally to the second plate portion 114. An engaging hole 123 engaged with the hook 151 is formed at the other end portion in the longitudinal direction (end portion opposite to the first plate portion 111) of the second plate portion 114.

The partition 110 having the above-described configuration extends when the partition 110 receives a load equal to or greater than a predetermined magnitude. Now, description is made of how the partition 110 extends, with reference to FIG. 5. In a state shown in FIG. 5A, when the second plate portion 114 is pulled in a direction away from the first plate portion 111, the partition 10 enters in a state shown in FIG. 5B. That is, the distal end portion of the first folding-back plate portion 112 (an end closer to a connection portion with the second folding-back plate portion 113) is curved to be turned up from the first plate portion 111. At the same time, the proximal end portion of the second folding-back plate portion 113 (a proximal end closer to a connection portion of the second folding-back plate portion 113 with the first folding-back plate portion 113) is curved to be turned up from the surface of the first folding-back plate portion 112. At this time, because the first folding-back plate portion 112 and the second folding-back plate portion 113 are locked by the locking member 115, the whole portions of the first and second folding-back plate portions 112 and 113 are not separated away from the first plate portion 111, but partial portions of the first and second folding-back plate portions 112 and 113 that are closer to the connection portion of the first folding-back plate portion 112 with the second folding-back plate portion 113 are separated away from each other. This results in a state in which the second folding-back plate portion 113 slides with respect to the first plate portion 111, and the second plate portion 114 separates from the first plate portion 111. Accordingly, the partition 110 extends.

Incidentally, if a force separating the second plate portion 114 from the first plate portion 111 is abruptly applied on the partition 10, the second folding-back plate portion 113 rapidly slides away from the first plate portion 111. However, the proximal end portion of the elongate hole 121 is slightly narrower than the opposite end closer to the widened T-top hole 121a, and thus, as the stand-up portion 118 of the locking member 115 relatively moves toward the proximal end portion of the elongate hole 121, it is more difficult for the stand-up portion 118 to move toward the proximal end portion of the elongate hole 121. This causes the slide of the second folding-back plate portion 113 to be braked, gradually decelerated, and stopped. Accordingly, this allows avoiding the locking member 115 from colliding with an edge portion of the proximal end portion of the elongate hole 121 at a high speed, so that it is possible to suppress the breakage of the locking member 115 and the edge portion of the elongate hole 121.

When the force separating the second plate portion 114 from the first plate portion 111 is released, a restoring force of the first folding-back plate portion 112 and the second folding-back plate portion 113 returns back the curved portion to an original planar shape, and pulls back the second plate portion 114 to the first plate portion 111.

As shown in FIGS. 4 to 7, the hooks 150 and 151 have the same shape as the hooks 50 and 51 of the first embodiment. The hooks 150 and 151 are fixed to the inner panels 31 and spaced apart by a predetermined distance in the front-rear direction. The hooks 150 and 151 may be made of, for example, a thermo-plastic olefinic elastomer (TPO). The materials of the hooks 150 and 151 may not be limited to TPO. The hook 150 arranged at a rear side includes a hook portion 152 that projects toward the inside of the luggage compartment and has a distal end portion projecting rearward. The hook portion 152 is engaged with a rear edge portion of the engaging hole 117 of the first plate portion 111. The hook 151 arranged at a front side includes a hook portion 153 that projects toward the inside of the luggage compartment and has a distal end portion projecting forward. The hook portion 153 is engaged with a front edge portion of the engaging hole 123 of the second plate portion 114.

The hooks 150 and 151 have higher rigidity than the hooks 50 and 51 of the first embodiment, and have a configuration in which the partition 110 deforms before the partition 110 is detached when a load equal to or greater than a predetermined magnitude is applied on the partition 10.

According to the vehicle luggage compartment structure 101 having the above-described configuration, the partition 10 can escape a load applied thereon by extending itself, because the partition 110 is configured to extend when a load equal to or greater than a predetermined magnitude is applied. Therefore, breakage of the partition 110 and the hooks 150 and 151 can be prevented.

Further, the partition 110 is not detached from the hooks 150 and 151, and thus, even opening the rear door does not cause the partition 110 to hang outward through the rear opening. Therefore, the partition 110 is never caught in the rear door, and thus, breakage of the partition 110, the rear door, and the door frame can be prevented.

Figure 7A:
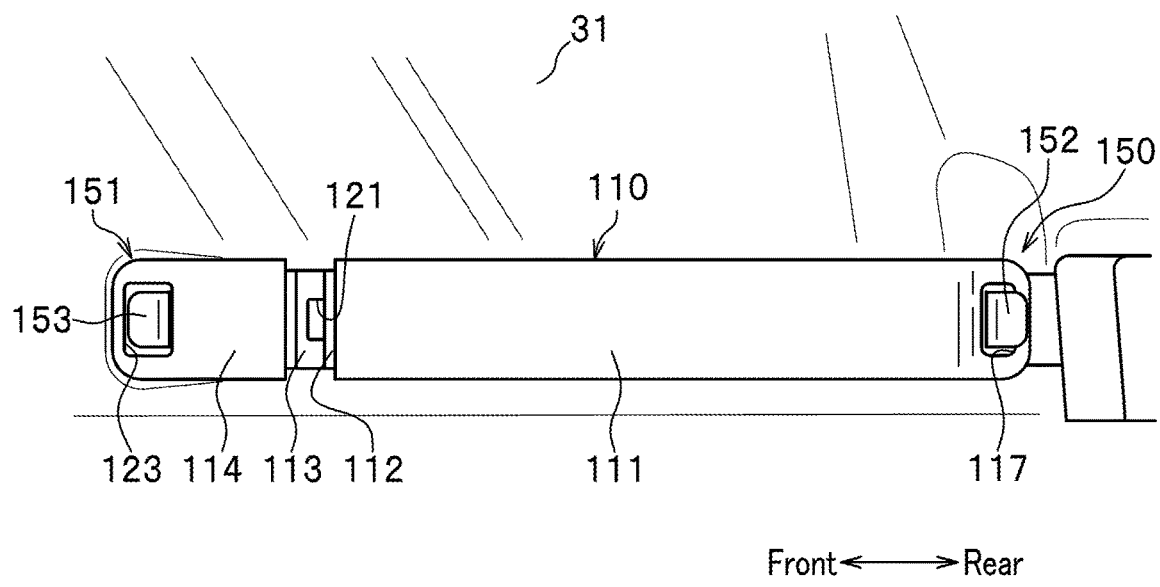
FIG. 7A is a perspective view showing a state of the partition of the vehicle luggage compartment structure according to the second embodiment of the present invention while the partition is being locked.
Figure 7B:
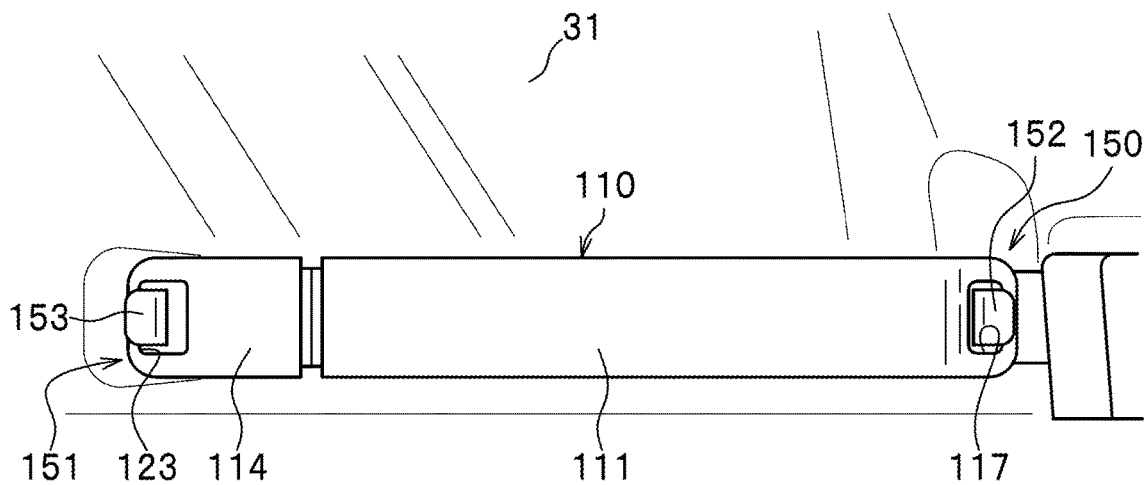
FIG. 7B shows a state of the partition after the partition is locked.

Furthermore, the partition 110 is extendable to be easily engaged with the hooks 150 and 151. When engaging the partition 110 with the hooks 150 and 151, the engaging hole 117 of the rear portion of the partition 110 is engaged with the hook portion 152 of the rear hook 150 as shown in FIG. 7A; and then, the partition 110 is extended by pulling forward and moving the second plate portion 114 to a position such that the hook portion 153 of the front hook 151 can be inserted through the engaging hole 123. In this state in which the second plate portion 114 is pulled forward, the hook portion 153 is inserted through the engaging hole 123. Thereafter, as shown in FIG. 7B, the second plate portion 114 is stopped being pulled and returned to an original position (the partition 110 is returned to the original length). Thereby, the engaging hole 123 engages with the hook portion 153.

Furthermore, the partition 110 includes the first plate portion 111, the first folding-back plate portion 112, the second folding-back plate portion 113, the second plate portion 114, and the locking member 115 in the above-described configuration, the partition 110 can be formed of a single member. Therefore, the partition 110 can be manufactured easily and in a low-cost, and made to be elastically extendable. The partition 110 can be manufactured at a lower cost than a conventional rubber belt.

Although the vehicle luggage compartment structures 1 and 101 according to the present embodiment are described in detail with reference to the drawings, the present invention is not limited thereto but may be modified appropriately as needed without departing from a scope of the present invention. For example, in the above-described embodiment, the partition 110 is formed by one member by folding the first folding-back plate portion 112 and the second folding-back plate portion 113, but is not limited thereto. The partition 110 may be formed in another configuration or formed of two members. Alternately, in the above embodiment, the first plate portion 111 is formed to be longer than the second plate portion 114, but the first plate portion and the second plate portion may have the same length, or the second plate portion may be longer than the first plate portion.

In addition, in the above-described embodiment, the partitions 10 and 110 separate the bottom surface portion 33c (the luggage base 2) of the side luggage space 30 from the floor board 45 (another luggage base 3), but a luggage base partitioned by the partitions 10 and 110 is not limited to these luggage bases. The partitions 10 and 110 can be used to separate the luggage compartment into the right and left sections or into the front and rear sections at a center portion.

REFERENCE SIGN LIST

1: vehicle luggage compartment structure
2: luggage base
3: luggage placing base
10: partition
50: hook
51: hook
101: vehicle luggage compartment structure
110: partition
111: first plate portion
112: first folding-back plate portion
113: second folding-back plate portion
114: second plate portion
115: locking member
150: hook
151: hook

We claim:

1. A structure of vehicle luggage compartment, comprising:
    a luggage base on which a luggage is placed;
    a partition having a belt shape and configured to separate the luggage base from other luggage spaces in the compartment,
    wherein
    both ends of the partition are detachably engaged respectively with a pair of hooks attached to a vehicle body;
    at least one of the pair of hooks is deformed to disengage from the partition when an externally-applied load equal to or bigger than a predetermined magnitude is applied to the partition; and
    the predetermined magnitude of the load at which the at least one of the pair of hooks is deformed is smaller than a magnitude of a load at which the partition is broken.

2. A structure of a vehicle luggage compartment, comprising:
    a luggage base on which a luggage is placed;
    a partition having a belt shape and configured to separate the luggage base from other luggage spaces in the compartment,
    wherein
    both ends of the partition are detachably engaged respectively with a pair of hooks attached on a vehicle body;
    the partition is made of resin having high rigidity, and is configured to extend when an externally-applied load equal to or bigger than a predetermined magnitude is applied.

3. A structure of a vehicle luggage compartment, comprising:
    a luggage base on which a luggage is placed;
    a partition having a belt shape and configured to separate the luggage base from other luggage spaces in the compartment,
    wherein
    both ends of the partition are detachably engaged respectively with a pair of hooks attached on a vehicle body;
    the partition is configured to extend when an externally-applied load equal to or bigger than a predetermined magnitude is applied; and
    the partition is made of resin and includes:
        a first plate portion;
        a first folding-back plate portion folded back at a distal end of the first plate portion along the first plate portion;
        a second folding-back plate portion folded back at a distal end of the first folding-back plate portion along the first plate portion and the first folding-back plate portion;
        a second plate portion continuing from a distal end of the second folding-back plate portion; and
        a locking member provided at an end portion of the first plate portion, and locking the first folding-back plate portion and the second folding-back plate portion in a state in which the first and second folding-back plate portions are folded,
    wherein the second folding-back plate portion includes an elongate hole extending in a longitudinal direction of the partition, and the locking member is inserted through the elongate hole to detachably engage with the second folding-back plate portion.

4. The structure of the vehicle luggage compartment according to claim 3, wherein the resin is polypropylene.

5. The structure of the vehicle luggage compartment according to claim 2, wherein the resin is polypropylene.

6. The structure of the vehicle luggage compartment according to claim 1, wherein the partition is made of resin having high rigidity.

7. The structure of the vehicle luggage compartment according to claim 6, wherein the resin is polypropylene.

* * * * *